US006902219B2

(12) United States Patent
Hess et al.

(10) Patent No.: US 6,902,219 B2
(45) Date of Patent: Jun. 7, 2005

(54) ACTUATING ARRANGEMENT FOR OPENING AND CLOSING HINGED MOTOR VEHICLE PANELS

(75) Inventors: Ralf Hess, Herrenberg (DE); Jürgen Moczygemba, Wannweil (DE); Kurt Schaible, Aidlingen-Dachtel (DE); Roland Scheurenbrand, Gäufelden (DE); Wolfgang Schneider, Calw (DE)

(73) Assignee: DaimlerChrysler AG, Stuttgart (DE)

( * ) Notice: Subject to any disclaimer, the term of this patent is extended or adjusted under 35 U.S.C. 154(b) by 800 days.

(21) Appl. No.: 09/853,901

(22) Filed: May 14, 2001

(65) Prior Publication Data

US 2002/0008400 A1 Jan. 24, 2002

(30) Foreign Application Priority Data

May 12, 2000 (DE) ........................................ 100 23 288

(51) Int. Cl.[7] ................................................ B62D 25/12

(52) U.S. Cl. .......................... 296/76; 296/324; 296/339

(58) Field of Search ......................... 296/76, 56, 146.8, 296/146.4; 49/324, 339, 340, 344

(56) References Cited

FOREIGN PATENT DOCUMENTS

| | | |
|---|---|---|
| DE | 40 07 162 | 9/1991 |
| DE | 297 05 362 U1 | 7/1997 |
| DE | 196 49 698 | 10/1997 |
| DE | 197 58 130 | 9/1998 |
| DE | 199 04 098 | 8/2000 |

OTHER PUBLICATIONS

German Office Action dated Oct. 6, 2003.

*Primary Examiner*—Joseph D. Pape
(74) *Attorney, Agent, or Firm*—Crowell & Moring LLP

(57) ABSTRACT

An actuating arrangement and method for opening and closing a hinged motor vehicle panel utilizes a controllable fluid drive and an uncontrolled fluid drive. The hinged motor vehicle panel is driven during opening from a starting position to a predetermined opening angle by the controlled fluid drive and, after reaching the predetermined angle of opening, is driven into its final position exclusively by the uncontrolled fluid drive.

24 Claims, 3 Drawing Sheets

ACTUATING ARRANGEMENT FOR OPENING AND CLOSING HINGED MOTOR VEHICLE PANELS

This application claims the priority of German Application No. 100 23 288.4-23, filed in Germany on May 12, 2000, the disclosure of which is expressly incorporated by reference herein.

The invention relates to an actuating arrangement for opening and closing hinged motor vehicle panels.

In such actuating arrangements, hinged motor vehicle panels such as flaps, lids, bonnets and doors are automatically opened and closed by means of drive mechanisms as required.

DE 40 07 162 A1 discloses such an actuating arrangement for opening and closing hinged motor vehicle panels having a controlled fluid drive and an uncontrolled fluid drive. The hinged motor vehicle panel is driven from a starting position into an end position by the controlled fluid drive and the uncontrolled fluid drive.

This actuating arrangement eliminates the known disadvantages associated with hinged tailgates, such as substantial expenditure of effort and difficulty reaching the tailgate when it is in its highest position.

However, in this actuating arrangement, the automatically driven tailgate is always abruptly slowed upon reaching its end position and may swing further in unfavorable conditions.

It is an object of the invention to provide an actuating arrangement for the opening and closing of motor vehicle panels which enables an automatic opening and closing of a motor vehicle panel such that the movement of the motor vehicle panel is slowed continuously in the final phase of its movement.

This object is achieved, according to the invention, by providing a controlled fluid drive and an uncontrolled fluid drive wherein, during an opening movement, the controlled fluid drive is actuable to move the hinged panel from a starting position to a first predetermined opening angle, after which point, the controllable fluid drive is deactuated, and the hinged panel is moved to an end position by the uncontrolled fluid drive.

The main concept of the invention resides in the fact that a controlled fluid drive is used as the drive during the opening movement of the motor vehicle panel from a starting position as far as a predetermined angle of opening. The controlled fluid drive is then switched off on attainment of the predetermined angle of opening and an uncontrolled fluid drive is then used individually for the final movement phase from the predetermined angle of opening into an end position. The power of the uncontrolled fluid drive is diminished over the length of its working stroke.

This ensures in an advantageous manner that the opening movement of the motor vehicle panel is not abruptly slowed but is gently stopped. This relieves stress on the end stop of the hinge mechanism or on the motor vehicle panel and the drive. As a hard contact is avoided according to the invention, a favorable noise pattern is also obtained.

Assistance during the closing movement of the motor vehicle panel takes place similarly to the opening movement. The motor vehicle panel is driven from the end position to a further predetermined angle of opening by the controlled fluid drive. During the closing movement, the controlled fluid drive is assisted by the force of gravity on the motor vehicle panel, the drive force of the controlled fluid drive and the force of gravity on the motor vehicle panel acting against the drive force of the uncontrolled fluid drive. During the final movement phase from the further predetermined angle of opening to the starting position, only the drive force of the uncontrolled fluid drive continues to act against the force of gravity on the motor vehicle panel.

The controlled fluid drive is controlled via a control unit, which for this purpose compares the current angle of opening of the motor vehicle panel with predetermined angles of opening and switches off the controlled fluid drive if the current angle of opening coincides with a predetermined angle of opening. The current angles of opening are detected by a swing angle sensor.

In a particularly advantageous embodiment of the invention the controlled fluid drive is designed as a hydraulic unit which comprises a hydraulic group and a hydraulic cylinder. The drive force of the hydraulic unit is here transmitted via a drive lever to a lever of a multi-joint hinge.

The uncontrolled fluid drive is preferably designed as a pair of gas springs which act to relieve the controlled fluid drive during the opening movement. In the embodiment described, the motor vehicle panel is driven jointly during the opening movement from the starting position to the predetermined angle of opening by the controlled fluid drive and the uncontrolled fluid drive. The total possible movement range of the motor vehicle panel is determined here by the working stroke of the uncontrolled fluid drive.

In an actuating arrangement according to the invention for a tailgate, one uncontrolled fluid drive is fitted on the left and one on the right, thereby substantially avoiding a twisting of the tailgate during opening or closing. This measure also reduces the tendency of the tailgate to vibrate.

Advantageously, the uncontrolled fluid drives are located outside the luggage compartment and to the side in an assigned water drainage channel of the aperture frame. As a result, no additional storage space within the luggage compartment is lost.

Other objects, advantages and novel features of the present invention will become apparent from the following detailed description of the invention when considered in conjunction with the accompanying drawings.

DETAILED DESCRIPTION OF THE DRAWINGS

Figure 1:
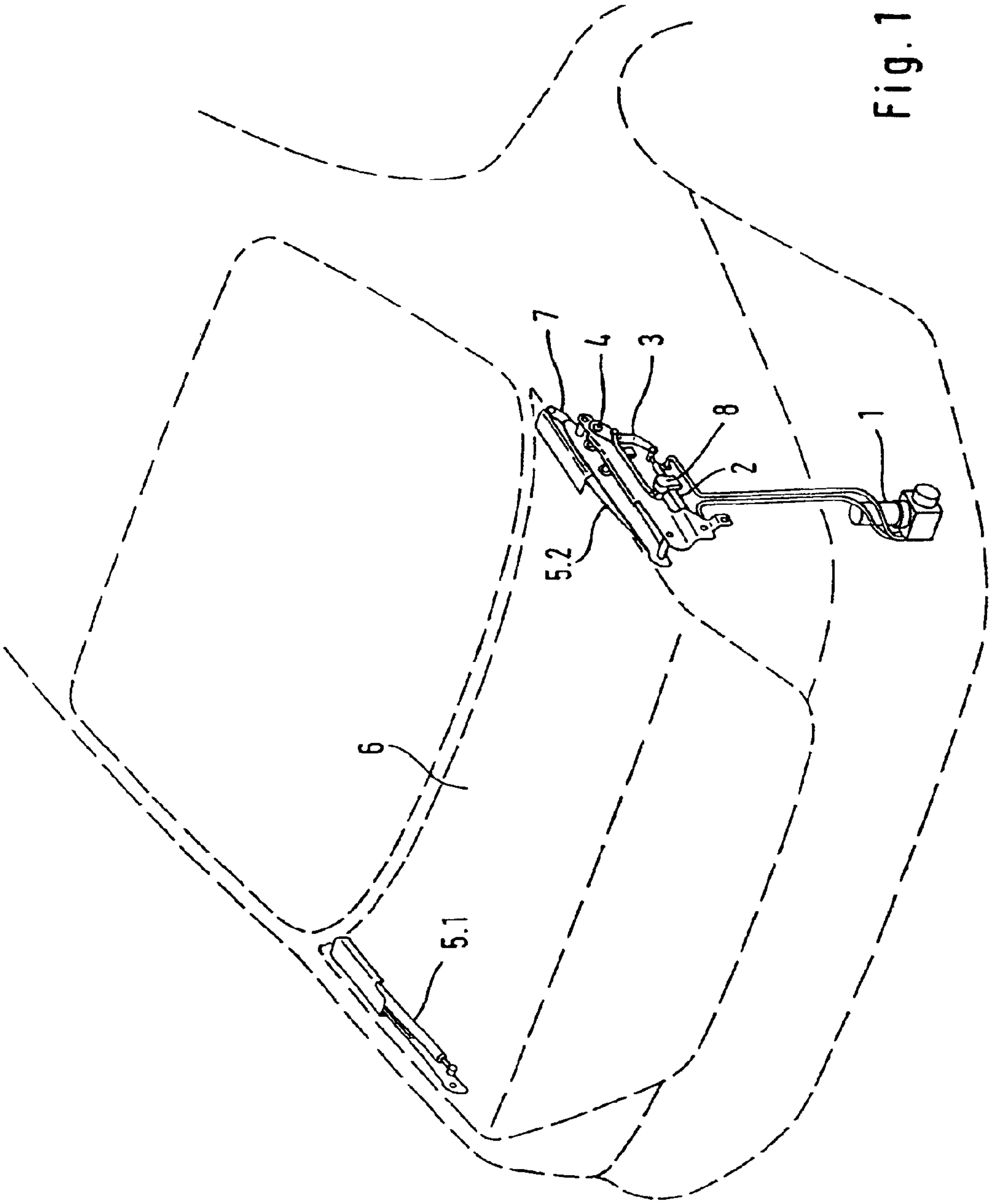
FIG. 1 shows a perspective tail-end view of a motor vehicle having an actuating arrangement for a tailgate.

Shown in FIG. 1, the controlled fluid drive comprises a hydraulic group 1, a hydraulic cylinder 2 and a drive lever 3 which is located in a right-hand side region of the luggage compartment. A drive force of the hydraulic cylinder 2 is transmitted via the drive lever 3 and a shaft 4 to a lever of a right-hand multi-joint hinge 7. The drive lever 3 is connected in an articulated manner to a rod head of the hydraulic cylinder 2. Via multi-joint hinges 7, the tailgate 6 is mounted on the body such as to be capable of swinging about a horizontal transverse axis of the vehicle. One uncontrolled fluid drive 5.1, 5.2 is arranged on each side of the tailgate 6 at the multi-joint hinges in order to relieve the load on the tailgate 6. The uncontrolled fluid drives 5.1, 5.2 can be embodied as gas springs 5.1, 5.2 and are arranged with mirror-image symmetry in, respectively, right-hand and left-hand water drainage channels. FIG. 1 shows the tailgate in its starting position A (closed).

Figure 2:
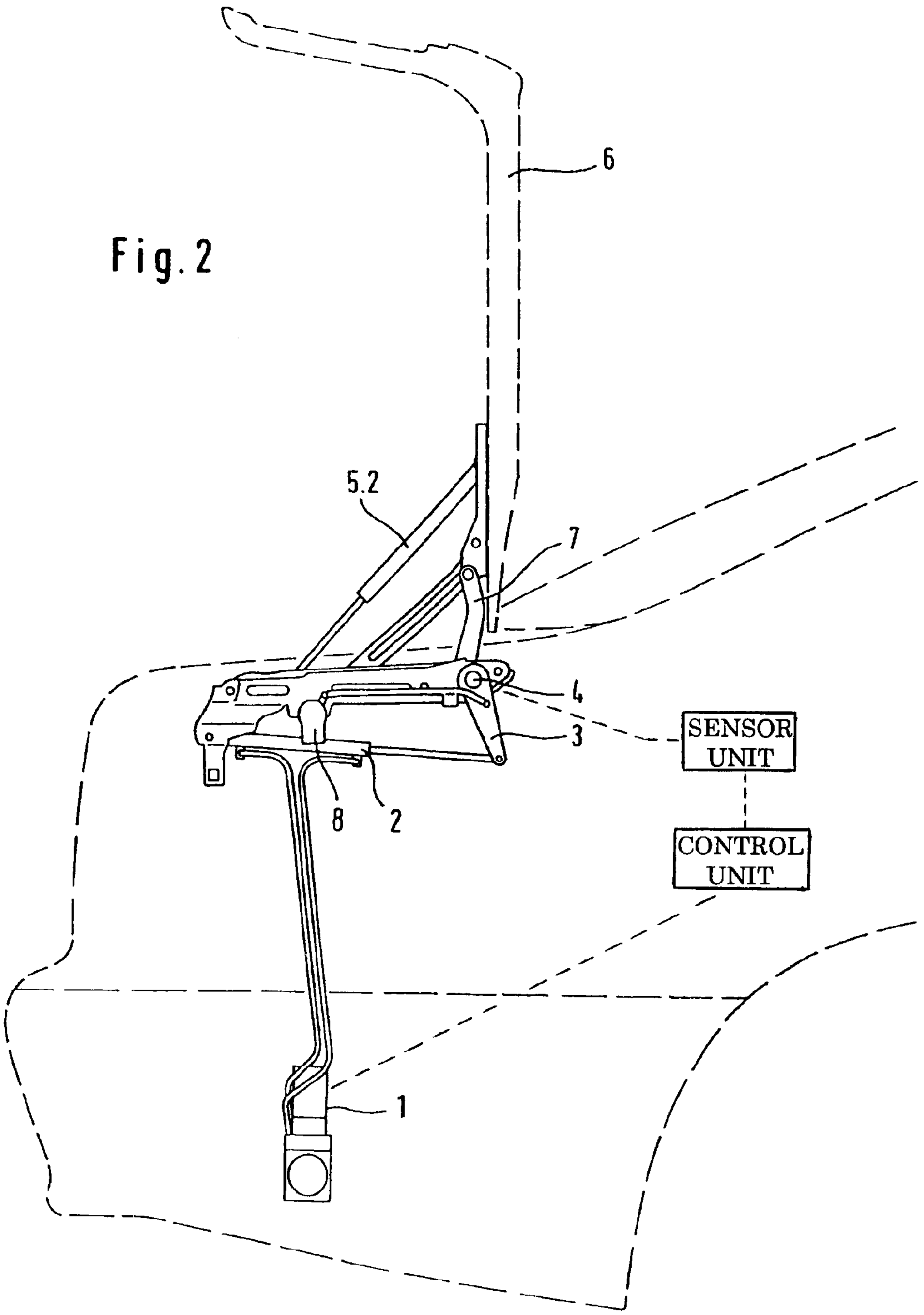
FIG. 2 shows a side view of the actuating arrangement with the tailgate opened.

FIG. 2 shows the tailgate 6 in its end position E (completely opened). The telescopic rods of the gas springs 5.1, 5.2 serve as uncontrolled fluid drives 5.1, 5.2 and are shown in the fully extended position in which the gas springs 5.1, 5.2 limit the maximum possible angle of opening of the tailgate and form a stop.

Figure 3:
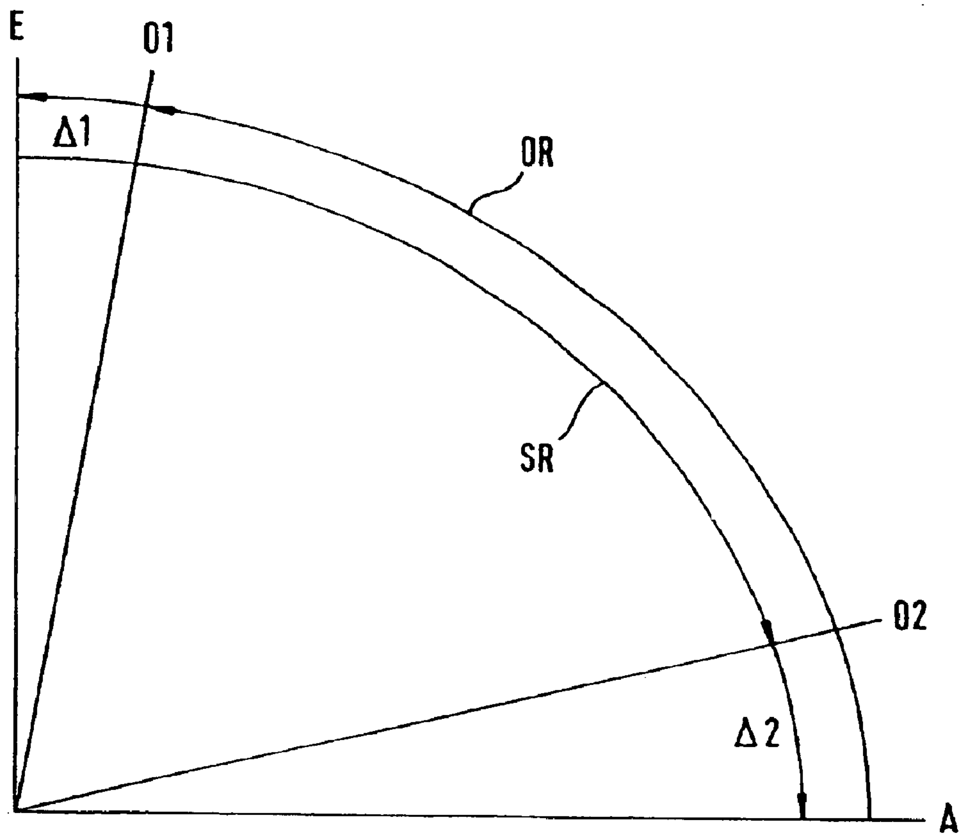
FIG. 3 shows a diagrammatic view of a control sequence for the tailgate.

FIG. 3 shows a diagrammatic illustration of a control sequence of the tailgate. In the event of an opening command, which is passed to a control unit, for example via a remote control, the control unit switches on the hydraulic group 1, as a result of which the hydraulic cylinder 2 is actuated so that the tailgate 6 is moved from its starting position A towards the end position E. This is illustrated in the diagram by the opening direction arrow OR. When a first predetermined angle of opening O1 is reached, the control unit switches off the hydraulic unit 1, 2. For the final movement phase of the opening movement 1 between the first predetermined angle of opening O1 and the end position E, the tailgate 6 continues to be driven only by the pair of gas springs 5.1, 5.2. The hydraulic cylinder 2 is released in this phase so that the piston rod is entrained further in the opening direction by the drive lever 3.

In the event of a closing command, the control unit switches on the hydraulic group 1 again, and the hydraulic cylinder 2 is subjected to pressure in a reverse operating direction. To this end, the control unit activates corresponding fluidic switching elements, for example a multiport valve. The tailgate 6 is now driven from its end position E towards its starting position A. This is illustrated in the diagram by the closing direction arrow SR. When a second predetermined angle of opening O2 is reached, the control unit switches off the hydraulic unit 1, 2. In the last movement phase of the closing movement 2, between the second predetermined angle of opening and the starting position A, only the spring force of the pair of gas springs 5.1, 5.2 continues to act against the force of gravity on the tailgate 6. The spring force of the pair of gas springs is so designed, however, that the force of gravity on the tailgate 6 is sufficient to reach the starting position A. The hydraulic cylinder 2 is released in this phase, similar to the case of the opening movement, so that the rod head is moved further by the drive lever 3 in the closing direction. The detection of the angle of opening and the switching-off of the hydraulic unit take place similarly to the case of the opening operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Actuating arrangement for opening and closing hinged motor vehicle panels comprising a controllable fluid drive and an uncontrolled fluid drive, wherein the hinged motor vehicle panel is driven during opening from a starting position to a predetermined angle of opening by the controlled fluid drive and after reaching the predetermined angle of opening is driven into an end position exclusively by the uncontrolled fluid drive.

2. Actuating arrangement according to claim 1, wherein the hinged motor vehicle panel is driven during closing from the end position to a further predetermined angle of opening by the controlled fluid drive and, after reaching the further predetermined angle of opening until the starting position is reached, the kinetic energy of the motor vehicle panel acts exclusively against the drive force of the uncontrolled fluid drive.

3. Actuating arrangement according to claim 1, wherein the controlled fluid drive is controlled by a control unit and a sensor unit, the sensor unit arranged to detect a current angle of opening of the motor vehicle panel and to pass it on to the control unit.

4. Actuating arrangement according to claim 2, wherein the controlled fluid drive is controlled by a control unit and a sensor unit, the sensor unit arranged to detect a current angle of opening of the motor vehicle panel and to pass it on to the control unit.

5. Actuating arrangement according to claim 3, wherein the control unit, during opening of the motor vehicle panel, switches off the controlled fluid drive when the detected angle of opening of the motor vehicle panel corresponds to a first angle of opening.

6. Actuating arrangement according to claim 4, wherein the control unit, during closing of the motor vehicle panel, switches off the controlled fluid drive when the detected angle of opening of the motor vehicle panel corresponds to a second angle of opening.

7. Actuating arrangement according to claim 1, wherein the controlled fluid drive is a hydraulic unit which comprises a hydraulic group and a hydraulic cylinder.

8. Actuating arrangement according to claim 1, wherein the uncontrolled fluid drive is a pair of gas springs.

9. Actuating arrangement according to claim 8, wherein the two gas springs of the pair of gas springs are each disposed in an assigned water drainage channel outside a luggage compartment.

10. Actuating arrangement according to claim 7, wherein the drive force of the hydraulic unit is transmitted via a drive lever to a lever of a hinge mounting the motor vehicle hinged panel.

11. An actuating arrangement for opening and closing a hinged panel of a motor vehicle comprising:

a controlled fluid drive operatively arranged on a body of the motor vehicle to control a movement of the hinged panel; and an uncontrolled fluid drive operatively arranged on the body of the motor vehicle to control the movement of the hinged panel;

wherein, during an opening movement, the controlled fluid drive is actuable to move the hinged panel from a starting position to a first predetermined opening angle, after which point, the controllable fluid drive is deactuated, and the hinged panel is moved to an end position by the uncontrolled fluid drive.

12. The actuating arrangement according to claim 11, wherein, during a closing movement, the controlled fluid drive is actuable to move the hinged panel from the end position to a second predetermined opening angle, after which point, the controllable fluid drive is deactuated, and the hinged panel is moved by way of its kinetic energy acting against a drive force formed by the uncontrolled fluid drive to the starting position.

13. The actuating arrangement according to claim 11, wherein the controlled fluid drive is controlled by a control unit and a sensor unit, the sensor unit being operable to provide a signal corresponding to a current opening angle of the hinged panel and to send the signal to the control unit.

14. The actuating arrangement according to claim 12, wherein the controlled fluid drive is controlled by a control unit and a sensor unit, the sensor unit being operable to provide a signal corresponding to a current opening angle of the hinged panel and to send the signal to the control unit.

15. The actuating arrangement according to claim 13, wherein the control unit, during the opening movement of the hinged panel, is operable to switch off the controlled fluid drive when the current opening angle of the hinged panel corresponds to a first predetermined opening angle.

16. The actuating arrangement according to claim 14, wherein the control unit, during the closing movement of the hinged panel, is operable to switch off the controlled fluid drive when the current opening angle of the hinged panel corresponds to a second predetermined opening angle.

17. The actuating arrangement according to claim 11, wherein the controlled fluid drive is a hydraulic unit which comprises a hydraulic group and a hydraulic cylinder.

18. The actuating arrangement according to claim 11, wherein the uncontrolled fluid drive comprises a pair of gas springs.

19. The actuating arrangement according to claim 18, wherein each of the gas springs is disposed in a water drainage channel situated exterior of a luggage compartment of the motor vehicle.

20. The actuating arrangement according to claim 17, wherein a drive force exerted by the hydraulic unit is transmitted via a drive lever to a lever of a hinge of the hinged panel.

21. An actuating arrangement for closing a hinged panel for a motor vehicle comprising:

a controlled fluid drive operatively arranged on a body of the motor vehicle to control a movement of the hinged panel; and an uncontrolled fluid drive operatively arranged on the body of the motor vehicle to control the movement of the hinged panel;

wherein, during a closing movement, the controlled fluid drive is actuable to move the hinged panel from an end position to a predetermined opening angle, after which point, the controllable fluid drive is deactuated, and the hinged panel is moved by way of its kinetic energy acting against a drive force formed by the uncontrolled fluid drive to the starting position.

22. A method of opening and closing a hinged panel for a motor vehicle comprising:

providing a controlled fluid drive operatively arranged on a body of the motor vehicle to control a movement of the hinged panel;

providing an uncontrolled fluid drive operatively arranged on the body of the motor vehicle to control the movement of the hinged panel;

actuating the controlled fluid drive during an opening movement to move the hinged panel from a starting position to a first predetermined opening angle;

deactuating the controllable fluid drive when the first predetermined opening angle is reached; and moving the hinged panel to an end position by the uncontrolled fluid drive.

23. The method of opening and closing a hinged panel according to claim 21, further comprising, actuating the controlled fluid drive during a closing movement to move the hinged panel from the end position to a second predetermined opening angle, deactuating the controlled fluid drive when the second predetermined opening angle is reached, and moving the hinged panel by way of its kinetic energy acting against a drive force formed by the uncontrolled fluid drive to the starting position.

24. A method of closing a hinged panel for a motor vehicle comprising:

providing a controlled fluid drive operatively arranged on a body of the motor vehicle to control a movement of the hinged panel;

providing an uncontrolled fluid drive operatively arranged on the body of the motor vehicle to control the movement of the hinged panel;

actuating the controlled fluid drive during a closing movement to move the hinged panel from an end position to a predetermined opening angle;

deactuating the controlled fluid drive when the predetermined opening angle is reached; and moving the hinged panel by way of its kinetic energy acting against a drive force formed by the uncontrolled fluid drive to the starting position.

* * * * *